US010313646B2

United States Patent
Shiraishi et al.

(10) Patent No.: US 10,313,646 B2
(45) Date of Patent: Jun. 4, 2019

(54) PROJECTION-TYPE VIDEO IMAGE DISPLAY APPARATUS

(71) Applicant: MAXELL, LTD., Kyoto (JP)

(72) Inventors: Akihiro Shiraishi, Kyoto (JP); Kazuo Shikita, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 16/075,338

(22) PCT Filed: Oct. 25, 2016

(86) PCT No.: PCT/HP2016/081629
§ 371 (c)(1),
(2) Date: Aug. 3, 2018

(87) PCT Pub. No.: WO2017/134873
PCT Pub. Date: Aug. 10, 2017

(65) Prior Publication Data
US 2019/0028680 A1 Jan. 24, 2019

(30) Foreign Application Priority Data

Feb. 5, 2016 (JP) .................. 2016-020385

(51) Int. Cl.
*G03B 21/20* (2006.01)
*H04N 9/31* (2006.01)
(Continued)

(52) U.S. Cl.
CPC ....... *H04N 9/3141* (2013.01); *G02B 27/0977* (2013.01); *G03B 21/142* (2013.01); *G03B 21/2066* (2013.01); *H04N 9/3182* (2013.01)

(58) Field of Classification Search
CPC .. G03B 21/2066; G03B 21/28; H04N 9/3158; H04N 9/3194; H04N 9/3182; G02B 27/141
See application file for complete search history.

(56) References Cited

U.S. PATENT DOCUMENTS

2006/0071146 A1 4/2006 Cheang et al.
2012/0224110 A1 9/2012 Kawamoto
(Continued)

FOREIGN PATENT DOCUMENTS

JP 4559949 B 5/2006
JP 2012-181296 A 9/2012
(Continued)

OTHER PUBLICATIONS

International Search Report for WO 2017/134873 A1, Jan. 17, 2017.

*Primary Examiner* — Ryan D Howard
(74) *Attorney, Agent, or Firm* — Volpe and Koenig, P.C.

(57) ABSTRACT

A projection-type video image display apparatus measures quantity of light of a plurality of light sources by maintaining illuminance distribution of an illumination luminous flux. The apparatus includes R, B and G light sources, and a mirror configured to reflect white light obtained by synthesizing the light rays emitted from the respective light sources while making the white light pass through the mirror based on predetermined transmittance characteristics. An illuminance sensor disposed on the mirror's back surface and configured to measure quantity of light for each color of the white light which passed through the mirror, and a controller adjusts an amount of light emission of the light source of each color based on the quantity of light measured. The mirror allows the transmittance characteristics of each light transmittance in the center wavelengths of the R and B lights sources to be larger than those of the G light source.

9 Claims, 6 Drawing Sheets

(51) Int. Cl.
*G02B 27/09* (2006.01)
*G03B 21/14* (2006.01)

(56) References Cited

U.S. PATENT DOCUMENTS

2014/0078474 A1* 3/2014 Nakao .................. H04N 9/3129
353/33
2014/0160440 A1 6/2014 Gyoten

FOREIGN PATENT DOCUMENTS

JP 2014-132259 A 7/2014
WO 2014/128883 A1 8/2014

* cited by examiner

PROJECTION-TYPE VIDEO IMAGE DISPLAY APPARATUS

TECHNICAL FIELD

The present invention relates to a technique of a projection-type video image display apparatus and particularly, relates to a technique effectively applied to a projection-type video image display apparatus including independent light sources.

BACKGROUND ART

In a projection-type video image display apparatus projecting video image onto a screen or the like (hereinafter, referred to as a "projector" in some cases), a white light source such as a high pressure mercury lamp or a xenon lamp has been conventionally used mainly as a light source. However, from a perspective of heat generation, product life, and resistance to obstacles, a light emitting diode (LED) light source has been recently used. In this case, for example, light sources of three colors such as red (R), green (G), and blue (B) are independently provided, and light rays emitted from these light sources are mixed and synthesized to form white light.

Meanwhile, in a conventional technique, when change such as reduction of quantity of light caused by degradation of a light source and temperature characteristics may be generated, in order to maintain desired preferable white light, quantity of light (illuminance) of light emitted from the light source is measured by a sensor provided in a projector or the like, and the measured value is fed back to output control of the light source to adjust the quantity of light.

For example, Japanese Patent No. 4559949 (Patent Document 1) describes an apparatus including a light source having emitting elements with different colors, and an optic element (prism) having a reflective material provided on a front surface thereof, the optic element being positioned to receive and reflect light emitted from the light source, in which a plurality of photosensors each measuring light having a different wavelength are mounted over a portion of the front surface of the optic element on which the reflective material is not provided, of the front surface of the optic element on which the reflective material is provided, and in which a control system receives measurement values from the plurality of photosensors to separately adjust light output of each of the emitting elements of the light source in accordance with the received measurement values.

RELATED ART DOCUMENT

Patent Document

Patent Document 1: Japanese Patent No. 4559949

SUMMARY OF THE INVENTION

Problems to be Solved by the Invention

For example, in a projector having independent LED light sources having three colors such as RGB, in order to maintain white light having a preferable color balance, it is required to individually control quantity of light of each color of RGB to be a suitable value. In this regard, according to the technique described in Patent Document 1, quantity of light of each color of RGB emitted from the light sources is individually measured by a sensor, and it is possible to feed back the measured value to output control of the light source of each color.

However, when a sensor is provided for each color of the light sources, mounting space may be restricted, and costs may be increased. In addition, in the technique described in Patent Document 1, it is configured such that a portion having a reflective coating applied onto an optical surface of the prism and one or more non-reflective opening portions not having reflective coating applied are provided, and a photosensor is mounted at a position corresponding to the non-reflective opening portion. This non-reflective opening portion affects reflective characteristics on the optical surface of the prism, and for example, illuminance distribution formed by an illumination luminous flux reflected on the optical surface of the prism may have spots (unevenness).

In view of this, an object of the present invention is to provide a projection-type video image display apparatus more preferably measuring quantity of light of each of a plurality of light sources, preferably maintaining illuminance distribution of an illumination luminous flux.

The above and other objects and novel features of the present invention will be apparent from the description of the present specification and the accompanying drawings.

Means for Solving the Problems

The typical ones of the inventions disclosed in the present application will be briefly described as follows.

A projection-type video image display apparatus according to a typical embodiment of the present invention is a projection-type video image display apparatus emitting light to a display element which generates a video image to project the video image, and the projection-type video image display apparatus includes: independent light sources configured to emit light rays of a plurality of colors including at least red, blue, and green, respectively; a mirror configured to reflect white light obtained by synthesizing the light rays emitted from the light sources while making the white light pass through the mirror based on predetermined transmittance characteristics; an illuminance sensor disposed on a back surface side of the mirror and configured to measure quantity of light of each color of the white light which has passed through the mirror; and a controller configured to acquire information on the quantity of light measured by the illuminance sensor and adjust an amount of light emission of the light source of each color based on the acquired information.

Also, the mirror is formed so as to have such transmittance characteristics that each of light transmittances in a center wavelength of a red light source and in a center wavelength of a blue light source is larger than a light transmittance in a center wavelength of a green light source.

Effects of the Invention

Effects obtained by the typical ones of the inventions disclosed in the present application will be briefly described as follows.

More specifically, according to a typical embodiment of the present invention, it is possible to more preferably measure quantity of light of each of a plurality of light sources, preferably maintaining illuminance distribution of an illumination luminous flux.

BRIEF DESCRIPTIONS OF THE DRAWINGS

DETAILED DESCRIPTION OF PREFERRED EMBODIMENTS

Figure 1:
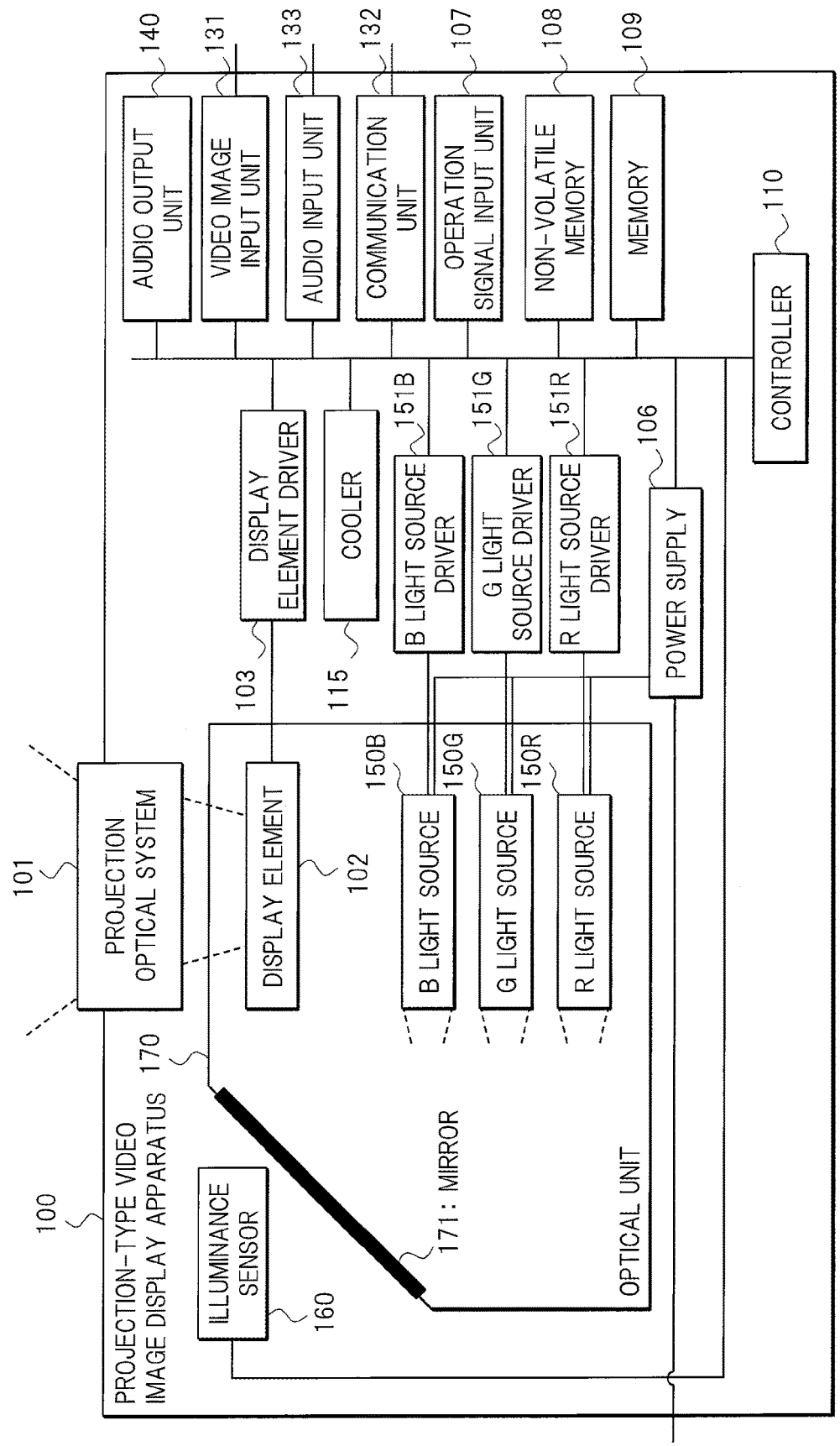
FIG. 1 is a view illustrating an outline of a configuration example of a projection-type video image display apparatus which is a first embodiment of the present invention.

Hereinafter, embodiments of the present invention will be described in detail, based on the accompanying drawings. Note that the same components are denoted by the same reference characters throughout all the drawings for describing the embodiments in principle, and the repetitive description thereof will be omitted. On the other hand, although a portion with a reference character described in a certain drawing is not illustrated again for the description of other drawings, Portion may be described with the same reference character.

(First Embodiment)

<Apparatus Configuration (Whole)>

FIG. 1 is a view illustrating an outline of a configuration example of a projection-type video image display apparatus which is the first embodiment of the present invention. A projection-type video image display apparatus 100 is a projector including a projection optical system 101 and an optical unit 170 as an optical system and for example, implemented as a digital light processing (DLP) (registered trademark) projector or the like. The projection optical system 101 is an optical system in which a video image is projected on a screen or the like and includes a lens and/or a mirror not illustrated. The optical unit 170 is an illumination optical system generating illumination light incident on the projection optical system 101 and includes, as components, a display element 102, a B (blue) light source 150B, a G (green) light source 150G, and an R (red) light source 150R which are independent light sources (hereinafter, collectively referred to as "light sources 150," in some cases), for example.

The display element 102 is an element generating a video image to be projected, and for example, a transmission liquid crystal panel, a reflective liquid crystal panel, a digital micromirror device (DMD) (registered trademark, the same hereinafter) panel, or the like, can be used. In the present embodiment, a description will be given assuming that the DMD panel is used for the display element. The display element 102 receives a drive signal in accordance with a video image signal from a display element driver 103 and generates a video image to be projected based on this drive signal. The light sources 150 are each constituted by an LED light source emitting illumination light of an intended color (RGB) by receiving electric power supplied from a power supply 106. Light emission of each of the light sources 150 is controlled by a driver corresponding to each color (B light source driver 151B, G light source driver 151G, or R light source driver 151R (hereinafter, collectively referred to as "light source drivers 151," in some cases)).

The optical unit 170 mixes and synthesizes illumination light rays emitted from the light sources 150 of three colors to generate white light, and this white light is reflected by a mirror 171 to be incident on the display element 102. Then, in the present embodiment, an illuminance sensor 160 provided at a predetermined position on a back surface of the mirror 171 measures quantity of light of each color (RGB) to feed back to a controller 110 to be described later, and the controller 110 enables output (an amount of light emission) of each of the light sources 150 to be individually adjusted via the light source driver 151. The optical unit 170 will be described in detail later. Note that, although a case in which white light is generated by using the light sources 150 of three colors (RGB) is exemplified in the present embodiment, even a configuration in which white light is generated by using light sources of two colors or four or more colors is similarly applicable.

The projection-type video image display apparatus 100 further includes the power supply 106, an operation signal input unit 107, a non-volatile memory 108, a memory 109, the controller 110, a cooler 115, a video image input unit 131, a communication unit 132, an audio input unit 133, and an audio output unit 140.

The power supply 106 receives an electric power supplied from an external power supply not illustrated to supply an electric power for operation to the light sources 150 and other units. The operation signal input unit 107 is an input interface for performing an operation of the projection-type video image display apparatus 100 by a user and for example, includes operation buttons, not illustrated, provided on a main body of the projection-type video image display apparatus 100, and a light receiving portion of a remote controller to receive input of an operation signal from the user.

The non-volatile memory 108 is constituted by a non-volatile memory such as a flash memory and for example, stores various kinds of setting information relating to the projection-type video image display apparatus 100. In the present embodiment, various kinds of parameters for controlling quantity of light or the like of the light sources 150 of respective colors may be stored therein. The memory 109 is constituted by a volatile memory such as a DRAM (dynamic random access memory) and buffers a video image data serving as a projection target and input via the video image input unit 131 and the like to be described later or extracts data for various kinds of controls relating to the projection-type video image display apparatus 100 to be stored.

The cooler 115 is composed of a fan or the like for discharging heat generated from the light sources 150 outside to prevent the apparatus 100 from becoming higher in temperature. The video image input unit 131 and the audio input unit 133 input video image data to be projected and audio data to be output, respectively, from an information processing apparatus or the like, not illustrated, which is connected through an external interface. The input video image data and audio data may be buffered in the memory 109. The communication unit 132 communicates with an external apparatus such as the information processing apparatus, not illustrated, and has a function of inputting and outputting various kinds of control signals or the like. The communication unit 132 may have a network interface such as the Internet or LAN (local area network). The audio output unit 140 includes a speaker, an external output terminal, and the like which are not illustrated, and outputs audio information in association with a display video image and outputs notification sound, warning sound, audio information, and the like relating to operation, an error, and the like of the projection-type video image display apparatus 100.

The controller 110 controls operation of respective units of the projection-type video image display apparatus 100. More specifically, in the present embodiment, the controller 110 acquires information of quantity of light of the light sources 150 of respective colors measured by the illuminance sensor 160 and outputs a drive signal to the light source driver 151 of each color based on the acquired value so as to adjust the quantity of light of the corresponding light source 150 to be a desired value, thereby readjusting a color balance of a video image to be projected.

Acquisition of the quantity of light of the light source 150 of each color and readjustment of the color balance by the controller 110 described above (hereinafter, simply described as a "color balance readjustment" in some cases) may be performed periodically at a predetermined timing in accordance with a mode or the like set by the user, for example, and may be performed additionally at a timing at which the projection-type video image display apparatus 100 detects a condition or a status set in advance.

For example, the color balance readjustment may be always performed at a highest frequency (that is, for every frame). In addition, the color balance readjustment may be performed at a high frequency (for every frame) for a predetermined period of time from a start of using the projection-type video image display apparatus 100 (substantially 20 minutes, for example) and thereafter, switched at a low frequency (several times per a minutes, for example). In addition, the color balance readjustment may be performed about only once per one use of the projection-type video image display apparatus 100 (for example, performed only once 20 minutes after lighting-up of the light source 150). At this time, for example, when an integration time relating to light emission of the light source 150 of each color exceeds a predetermined value which is sufficiently longer than a period of time taken for one-time use of the projection-type video image display apparatus 100, the color balance readjustment for correcting time degradation may be performed.

A frequency of the color balance readjustment may be changed dynamically in accordance with an operation mode of the projection-type video image display apparatus 100. For example, when a light controlling mode (video image conjunction variable light controlling mode) in which light emission intensity of the light source 150 is set to be variable in conjunction with a video image signal turns ON, the frequency of the color balance readjustment may be made greater than that when the light controlling mode turns OFF.

In addition, the color balance readjustment may be performed directly after a setting of white balance is changed in the projection-type video image display apparatus 100. At this time, the color balance readjustment may be performed at a high frequency (for every frame) for a predetermined period of time from the change of setting of the white balance (substantially, 20 minutes, for example). Note that, in changing the setting of the white balance, generation of a video image on the display element 102 (DMD panel) may be muted. In addition, when a gravity sensor, not illustrated, which is mounted in the projection-type video image display apparatus 100, detects change of a position, the color balance readjustment may be performed directly after the detection. At this time, the color balance readjustment may be performed at a high frequency (for every frame) for a predetermined period of time from the detection (substantially, 20 minutes, for example).

<Apparatus Configuration (Optical System)>

Figure 2:
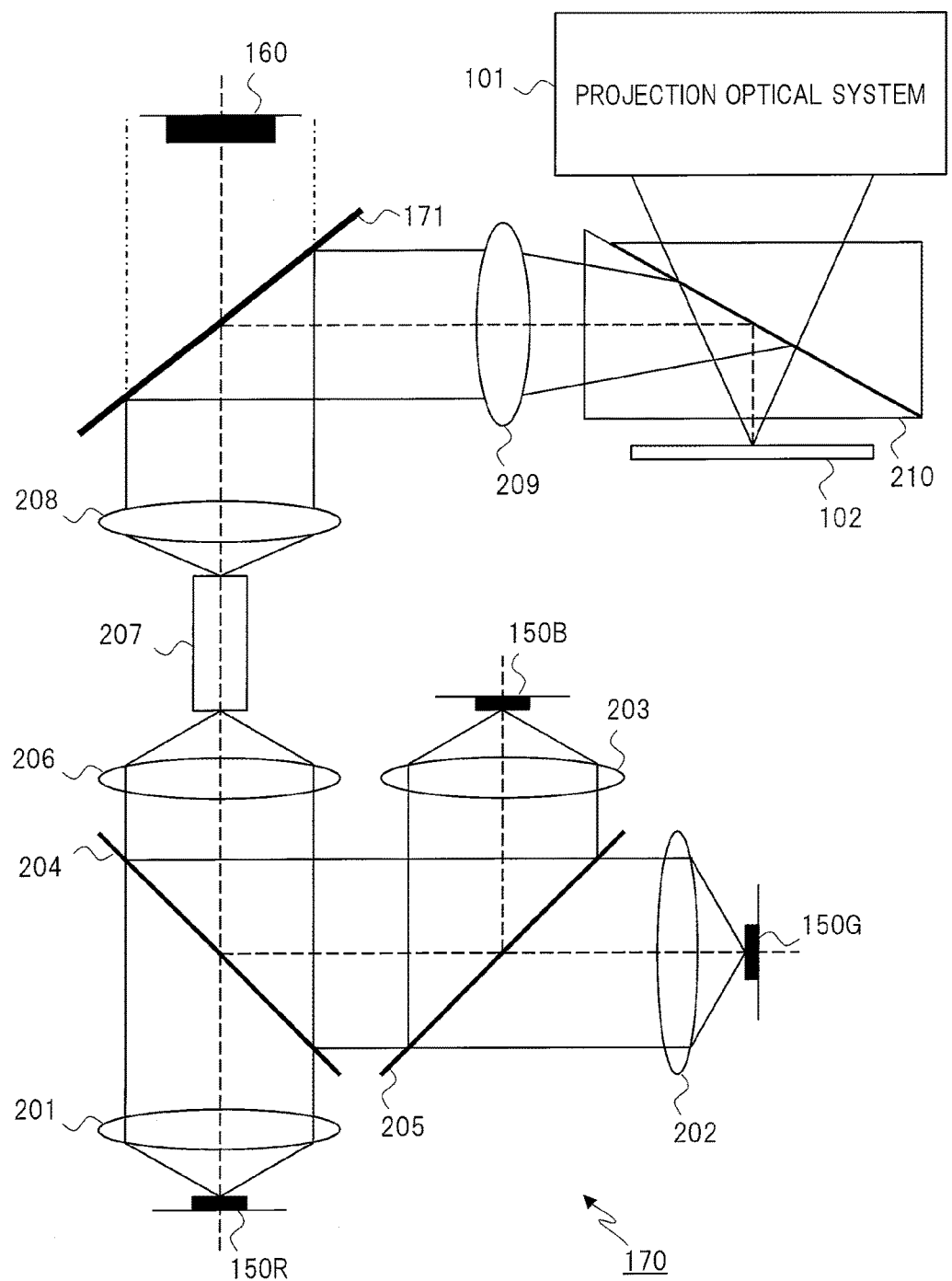
FIG. 2 is a diagram illustrating an outline of a configuration example of an optical unit in the first embodiment of the present invention.

FIG. 2 is a diagram illustrating an outline of a configuration example of the optical unit 170 in the present embodiment. In the optical unit 170, irradiation light rays diffused by being emitted from the light sources 150 of three colors, such as the R light source 150R, the G light source 150G, and the B light source 150B which are each disposed at a different position, become illumination luminous fluxes by corresponding relay lenses 201, 202, and 203, respectively, and these illumination luminous fluxes are synthesized by color synthesis mirrors (dichroic mirrors) 204 and 205 to generate a white illumination luminous flux. In the example of FIG. 2, the irradiation light ray from the G light source 150G and the irradiation light ray from the B light source 150B are synthesized by the color synthesis mirror 205, and the synthesized light ray and the irradiation light ray from the R light source 150R are further synthesized by the color synthesis mirror 204.

The synthesized white illumination luminous flux is made incident on a rod integrator 207 through a relay lens 206 and then, after the illuminance distribution is made uniform, taken out through a relay lens 208. This illumination luminous flux is reflected by the mirror 171 and then, made incident on a total internal reflection (TIR) prism 210 through a relay lens 209, and totally reflected inside the TIR prism 210 to be irradiated to the display element 102 (the DMD panel in the present embodiment) where a video image to be projected is generated. Then, the light reflected by the display element 102 passes through the TIR prism 210 to be incident on the projection optical system 101, and the video image is projected on a screen or the like, not illustrated, by the projection optical system 101.

Also, in the present embodiment, in order to measure quantity of light of the illumination light emitted from each of the light sources 150 of respective colors, one illuminance sensor 160 is provided at a predetermined position on a side of an opposite surface (hereinafter, referred to as a "back surface" in some cases) to a reflection surface (a surface on which the illumination luminous flux is reflected) of the mirror 171. Typically, a mirror used as the mirror 171 is not one with a reflectance of 100% (that is, a transmittance of 0%), but one with a transmittance of a little less than 1% to several percent. In view of this, the illuminance sensor 160 disposed on the back surface side of the mirror 171 measures quantity of light of the light which has passed through the mirror 171 without being reflected, among the white illumination luminous flux irradiated to the mirror 171, for each color of the light sources 150. Note that it is desirable to prevent an increase of costs by reducing the number of sensors by using, as the illuminance sensor 160, a sensor capable of sequentially and cyclically measuring quantity of light of each of a plurality of colors for a cycle of 1 KHz or the like in a time-division manner, for example.

As illustrated in the drawing, in the present embodiment, an optical axis (hereinafter, referred to as an "illumination optical system optical axis" in some cases, and indicated by a broken line in the figure) of the illumination luminous flux from the light sources 150 of respective colors to the display element 102 in the optical unit 170 is common to each other after the illumination luminous fluxes of respective colors are synthesized by the color synthesis mirrors 204 and 205 to be the white light, and the illumination luminous flux goes toward the mirror 171 ahead of the illuminance sensor 160 in this state to be incident on the mirror 171. Also, the illuminance sensor 160 is disposed along an extended line in the illumination optical system optical axis common to these respective colors (on the back surface side of the mirror 171).

Here, the illumination sensor 160 is desirably a planar sensor for suitably measuring a transmitted light of the illumination luminous flux, and it is desirable that a surface serving as a light receiving portion of the sensor is disposed to be perpendicular to (the extended line of) the illumination optical system optical axis. Also, an area of the light receiving portion is smaller than an area of the irradiation range of (the transmitted light of) the illumination luminous flux, and it is desirable to dispose the illuminance sensor 160 such that the light receiving portion is included in the irradiation range.

Thus, in the present embodiment, by disposing the illuminance sensor 160 along the extended line of the illumination optical system optical axis on the back surface side of the mirror 171, it is possible to measure quantity of light of the illumination luminous flux which has passed through the mirror 171. Accordingly, for example, it is possible to measure quantity of light corresponding to the ("managed") illumination luminous flux actually used for projection and display of a video image, not ("unmanaged") light not used for projection and display of a video image, such as diffusion light not present on the optical path of the illumination luminous flux. Then, accordingly, it is possible to more suitably perform output control of the light sources 150 of respective colors based on measured results.

Note that, in order to obtain the above effects more reliably, for example, by enclosing the region in which the illuminance sensor 160 is disposed in the optical unit 170 in a dark room environment, it is desirable to prevent the "unmanaged" light such as light diffusely reflected at other places in the apparatus from being measured by the illuminance sensor 160 as much as possible.

In the configuration example of FIG. 2, the illuminance sensor 160 is not disposed directly on the back surface of the mirror 171, but is disposed at a position a little apart from the back surface side of the mirror 171 along the extended line of the illumination optical system optical axis. In this manner, even when reflection of the illumination light occurs on a front surface of the display element 102, and the reflected illumination light reversely travels through the optical path to be re-incident on the mirror 171 and a part of the re-incident light passes through the mirror 171, the transmitted light travels in a different direction from a direction where the illuminance sensor 160 is positioned. Therefore, this configuration makes it possible to prevent the reflected light of the display element 102 which is the "unmanaged" light from being measured by the illuminance sensor 160.

<Measurement of Quantity of Light of RGB>

Figure 3:
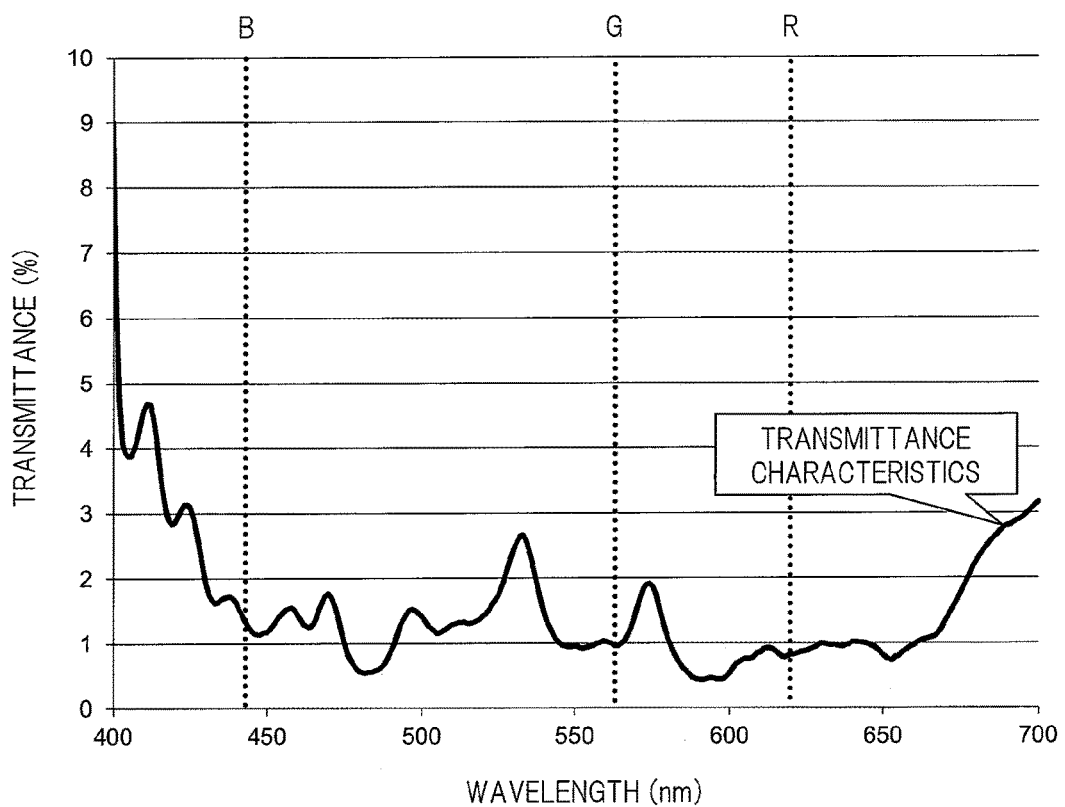
FIG. 3 is a graph illustrating an example of transmittance characteristics of light for each wavelength in a commonly-used mirror.

FIG. 3 is a graph illustrating an example of transmittance characteristics of light for each wavelength in a commonly-used mirror. In the example of FIG. 3, a transmittance in the vicinity of a center wavelength of the light of each color (RGB) (indicated by a dotted line in the figure. For example, in the example of FIG. 3, in the vicinity of 450 nm for B, in the vicinity of 560 nm for G, and in the vicinity of 620 nm for R) is substantially around 1% and flat. Also, the transmittance characteristics are substantially uniform regardless of a position on the surface of the mirror.

As described above, in the present embodiment, quantity of light of each color (RGB) of the white illumination luminous flux which has passed through the mirror 171 is measured by the illuminance sensor 160 disposed on the back surface side of the mirror 171. Accordingly, in the present embodiment, the illuminance distribution of the illumination luminous flux which has passed through the mirror 171, serving as a target to be measured by the illuminance sensor 160, becomes substantially uniform in an effective range of the illumination luminous flux. More specifically, it is possible to prevent spots (unevenness) of the illuminance distribution which may be generated when the technique described in Patent Document 1 above is used.

Meanwhile, although it may be good if a result measured by the illuminance sensor 160 can be used as it is, sensitivity in the illuminance sensor 160 actually differs in each color (RGB), and as a result, characteristics of sensor output (that is, sensitivity of the sensor×quantity of light) with respect to quantity of light irradiated greatly differ in each color (RGB).

Figure 4:
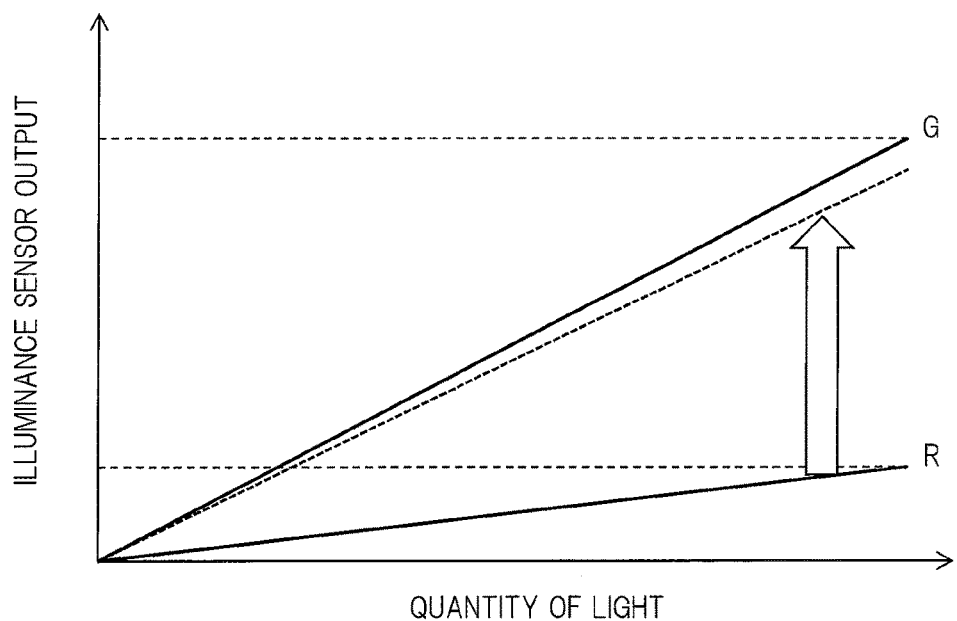
FIG. 4 is a graph illustrating an example of a relation between quantity of light irradiated to an illuminance sensor and output of the illuminance sensor.

FIG. 4 is a graph illustrating an example of a relation between quantity of light irradiated to the illuminance sensor 160 and output of the illuminance sensor. As indicated by a solid line in the figure, in general, the color having the highest sensitivity in the illuminance sensor 160 (great dynamic range) is green (G), and in contrast, the dynamic range of red (R) is only substantially ⅕ of that of green. Regarding blue (B), it is substantially the same as red (R). In this case, it is required to prevent saturation of output in order to perform control in accordance with output from the illuminance sensor 160. Accordingly, in a case in which sensitivity of the illuminance sensor 160 has characteristics indicated in FIG. 4, when gain of the illuminance sensor 160 is used so as to correspond to green (G), detection ability of the sensor cannot be sufficiently used for red (R) and blue (B). In particular, when quantity of light is small, measurement error becomes large.

Herein, for example, as indicated with an arrow in the figure, it can be considered that the gain is electrically corrected by a circuit process or the like such that the dynamic ranges for red (R) and blue (B) become substantially the same as that of green (G). For example, when the illuminance sensor 160 sequentially and cyclically measures quantity of light for each color (RGB) in a time-division manner, it is considered that the gain is increased five times only at a timing of measuring red (R) and blue (B). However, in this case, although the gain is increased five times, noise is also increased five time, and measurement accuracy cannot be the same as that of green (G).

In view of this, in the present embodiment, by not performing correction of gain or the like, but using a mirror whose transmittance is adjusted for each color as the mirror 171, each quantity of light itself passing through the mirror 171 of the irradiation luminous fluxes of red (R) and blue (B) is increased more than in a case of using a commonly-used mirror. As a result of this, the dynamic range of output of the illuminance sensor 160 is made substantially the same as that of green (G). Note that the mirror whose transmittance is adjusted for each color can be appropriately formed by use of a well-known technique.

Figure 5:
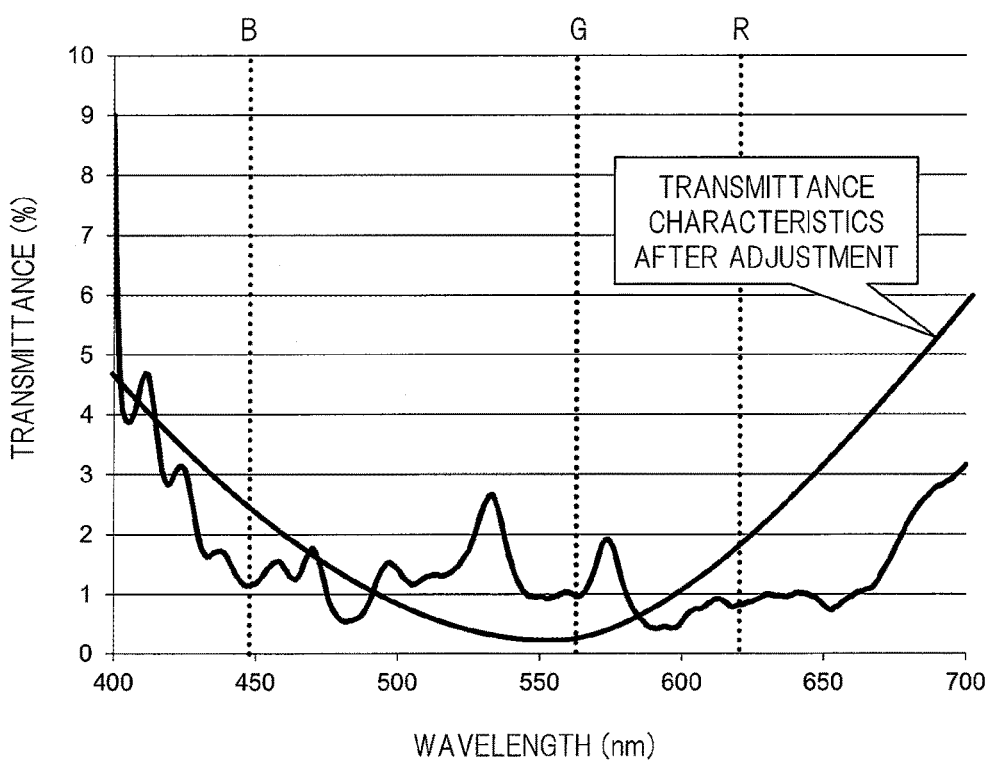
FIG. 5 is a graph illustrating an example of transmittance characteristics adjusted for each color in the mirror of the first embodiment of the present invention.

FIG. 5 is a graph illustrating an example of transmittance characteristics adjusted for each color in the mirror 171 of the present embodiment. A curve of transmittance characteristics after adjustment in the figure schematically indicates the example of transmittance characteristics adjusted for each color, and it is not necessarily required to have such a curved shape. In this embodiment, it is adjusted such that each transmittance of red (R) and blue (B) becomes relatively larger than that of green (G) (R>G, B>G). Since light of green (G) contributes most to brightness of the projection-type video image display apparatus 100, it is desirable to increase the reflectance of the mirror 171 and decrease the transmittance of the mirror 171 as much as possible. Accordingly, the transmittance of green (G) is desirably smaller than 1% in the vicinity of a center wavelength of the G (green) light source 150G. In contrast, for example, it is sufficient only if each transmittance of red (R) and blue (B) is larger than 1% in the vicinity of a center wavelength of the light source 150 of each color. More desirably, each transmittance of red (R) and blue (B) is set to be at least three times or more (substantially four to five times) of the transmittance of green (G). More specifically, for example, when the transmittance of green (G) is set to be substantially 0.5%, each transmittance of red (R) and blue (B) is adjusted so as to be substantially 2.0% which is four times of the transmittance of green (G).

Although a magnitude relation of transmittance between red (R) and blue (B) is not particularly limited, taking into consideration typical characteristics of white light, the transmittance of blue (B) may be adjusted to be larger than the transmittance of red (R) (B>R>G). Meanwhile, for characteristics of the sensitivity of the illuminance sensor 160 to be used, when the sensitivity of red (R) is low, the transmittance of red (R) may be conversely adjusted to be larger than the transmittance of blue (B) (R>B>G).

As described above, according to the projection-type video image display apparatus 100 of the first embodiment of the present invention, by disposing the illuminance sensor 160 along the extended line of the illumination optical system optical axis on the back surface side of the mirror 171, quantity of light of the illumination luminous flus which has passed through the mirror 171 is measured. In this case, there is no need to provide a portion without reflective materials as the above-described Japanese Patent No. 4559949 (Patent Document 1), and accordingly, it is possible to make the reflectance substantially uniform in the effective range of the illumination luminous flux on the reflection surface of the mirror 171. Accordingly, the illuminance distribution of the illumination luminous flux which has passed through the mirror 171 can be made substantially uniform in the effective range of the illumination luminous flux, and it is possible to prevent spots (unevenness) from being generated. In addition, it is possible to measure quantity of light corresponding to the ("managed") illumination luminous flux actually used for projection and display of the video image, and output control of the light source 150 for respective colors based on measured results can be more suitably performed.

In addition, the mirror whose transmittance is adjusted for each color is used as the mirror 171, and each quantity of light itself passing through the mirror 171, of the irradiation luminous fluxes of red (R) and blue (B), is increased more than in the case of using a commonly-used mirror. As a result, the dynamic range of the output of the illuminance sensor 160 is made substantially the same as that of green (G). Accordingly, quantity of light of the light source 150 of each color can be measured with higher accuracy, and it is possible to more suitably perform output control of the light source 150.

As described above, according to the projection-type video image display apparatus 100 of the first embodiment of the present invention, it is possible to more preferably measure quantity of light of each of the plurality of light sources, preferably maintaining the illuminance distribution of the illumination luminous flux.

(Second Embodiment)

A projection-type video image display apparatus 100 of a second embodiment of the present invention has a basic configuration and a control method similar to the projection-type video image display apparatus 100 of the first embodiment, but a configuration of the mirror 171 in the optical unit 170 in the second embodiment is partially different from that in the first embodiment. This different point will be mainly described below.

Figure 6:
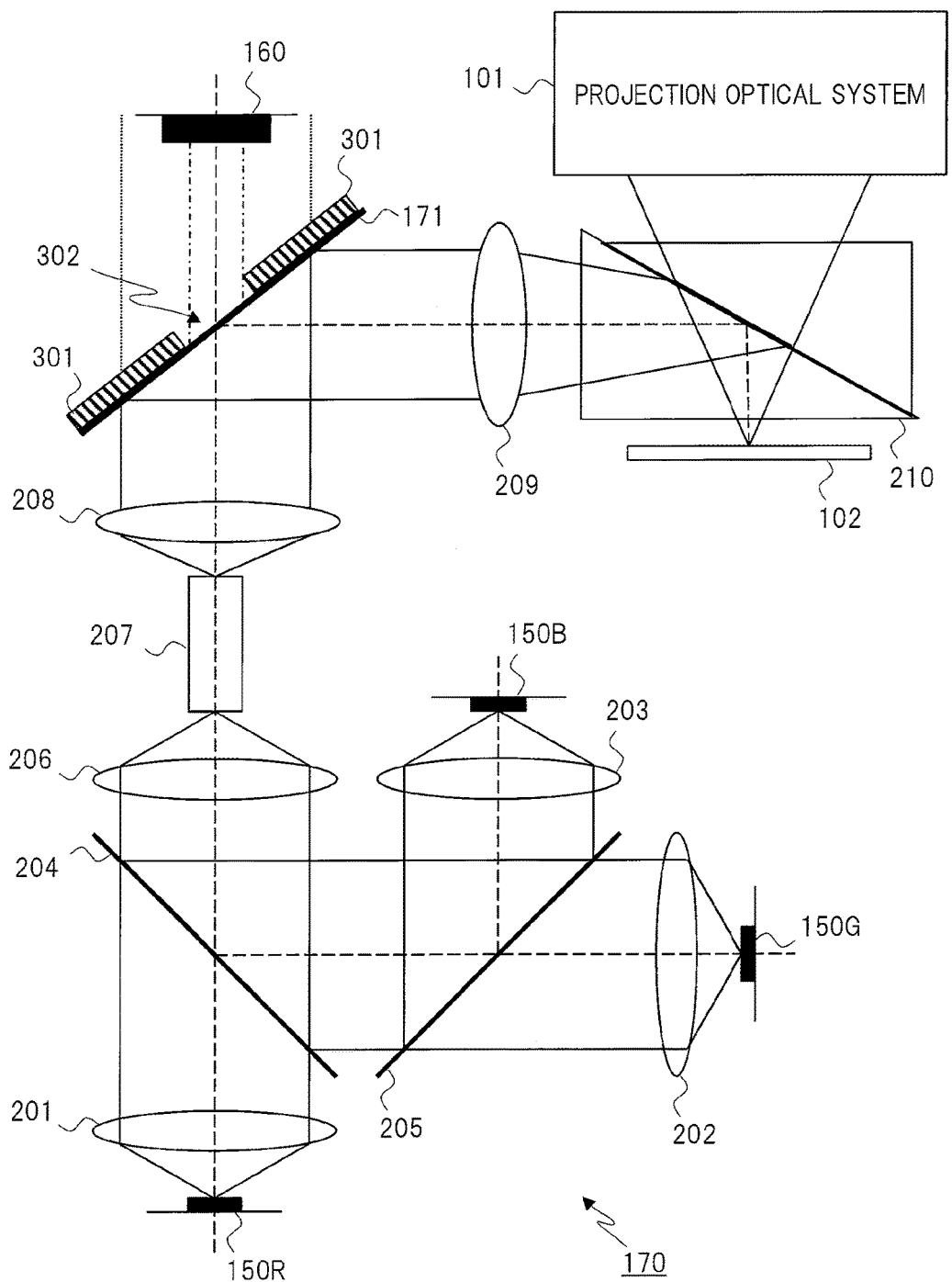
FIG. 6 is a diagram illustrating an outline of a configuration example of an optical unit in a second embodiment of the present invention.

FIG. 6 is a diagram illustrating an outline of a configuration example of the optical unit 170 in the second embodiment of the present invention. Since configurations other than a part of the mirror 171 disposed in front of the illuminance sensor 160 are the same as those illustrated in FIG. 2 in the first embodiment, a repetitive description will be omitted. In the present embodiment, on the back surface side of the mirror 171 (on a side on which the illuminance sensor 160 is disposed and opposite to a reflection surface), a light blocking mask 301 is provided at a position contacting the mirror 171 or in a proximity of the mirror 171. Note that, in the example of FIG. 6, the light blocking mask 301 is illustrated in a cross-sectional shape.

Figure 7:
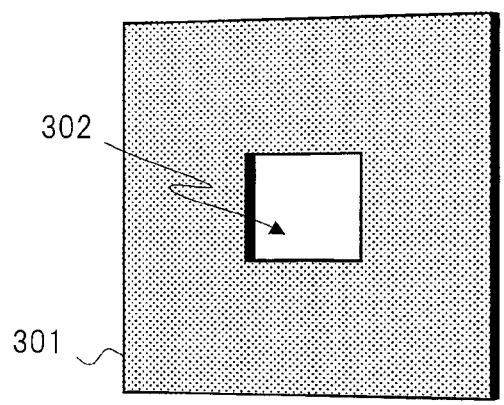
FIG. 7 is a view illustrating an example of a shape of a light blocking mask seen in a planar direction in the second embodiment of the present invention.

FIG. 7 is a view illustrating an example of a shape of the light blocking mask 301 seen in a planar direction. As illustrated in the figure, the light blocking mask 301 is, for example, composed of a plate-like member constituted by a light blocking material such as a metal, and includes an opening 302 (hole) which does not have the light blocking material in the vicinity of a center, thereby allowing only light emitted to this opening to pass through. In the present embodiment, taking into consideration heat resistance or the like, the light blocking mask 301 is constituted by a metal plate made of stainless steel (SUS) or the like, but it is also possible to use materials other than metals as long as they have a light blocking function, as a matter of course.

In addition, it is desirable that at least a surface irradiated with light in the light blocking mask 301 is subjected to black coating or the like in order to enhance a light blocking performance. In addition, in the example of FIG. 7, a shape of the opening 302 is rectangular, but it may be other shape such as a circular shape. In addition, in the present embodiment, it is configured that the light blocking mask 301 is formed with a metal plate or the like separately from the mirror 171 and as illustrated in FIG. 6, is disposed on the back surface side of the mirror 171 (or adhered to the mirror 171), but it is not limited to such configuration. For example, the shape similar to the planar shape of the light blocking mask 301 illustrated in FIG. 7 is formed by directly panting or coating paint or the like having the light blocking function on the back surface side of the mirror 171, so that the light blocking mask 301 may be formed directly on the back surface side of the mirror 171.

Returning to FIG. 6, in the present embodiment, the light blocking mask 301 illustrated in FIG. 7 is disposed on the back surface side of the mirror 171 in such a state in which the opening 302 includes a region of the extended line of the illumination optical system optical axis (a broken line in the figure). Accordingly, it is possible to limit such that, of the white illumination luminous fluxes which has passed through the mirror 171, only transmitted light in a fixed region including the vicinity of the extended line of illumination optical system optical axis can pass through the opening 302. More specifically, by cutting the transmitted light serving as noise in the vicinity of an outer periphery of the illumination luminous flux, it is possible to improve measurement accuracy of the illuminance sensor 160 more.

In order to obtain the above effects more reliably, an area of the opening 302 (more accurately, a projection area onto a surface perpendicular to the illumination optical system optical axis) is made smaller than the area of the irradiation range of the illumination luminous flux, and it is desirable to adjust the shape and a disposition position of the opening 302 such that the opening 302 is included in the irradiation range. Moreover, the area of the light receiving portion of the illuminance sensor 160 is smaller than the area of the opening 302 described above, and it is desirable to dispose the illuminance sensor 160 such that the light receiving portion is included in the irradiation range of the transmitted light which has passed through the opening 302.

As described above, according to the projection-type video image display apparatus 100 of the second embodiment of the present invention, the projection-type video image display apparatus 100 has the effects of the projection-type video image display apparatus 100 of the first embodiment described above, and it is possible to measure quantity of light of the light source for each color more suitably.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the above-described embodiments have been described in detail so that the present invention is easily understood, and is not limited to the one necessarily including all configurations described. Also, a part of the configuration of an embodiment can be replaced with the configuration of other embodiments, and the configuration of other embodiments can be added to the configuration of an embodiment. In addition, other configurations can be added to, deleted from, or replaced with the part of the configuration of each embodiment.

INDUSTRIAL APPLICABILITY

The present invention can be used for a projection-type video image display apparatus having independent light sources.

EXPLANATION OF REFERENCE CHARACTERS

100 . . . Projection-Type Video image Display Apparatus, 101 . . . Projection Optical System, 102 . . . Display Element, 103 . . . Display Element Driver, 106 . . . Power Supply, 107 . . . Operation Signal Input Unit, 108 . . . Non-Volatile Memory, 109 . . . Memory, 110 . . . Controller, 115 . . . Cooler, 131 . . . Video Image Input Unit, 132 . . . Communication Unit, 133 . . . Audio Input Unit, 140 . . . Audio Output Unit, 150B . . . B Light Source, 150G . . . G Light Source, 150R . . . R Light Source, 151B . . . B Light Source Driver, 151G . . . G Light Source Driver, 151R . . . R Light Source Driver, 160 . . . Illuminance Sensor, 170 . . . Optical Unit, 171 . . . Mirror, 201 to 203 . . . Relay Lens, 204 to 205 . . . Color Synthesis Mirror, 206 . . . Relay Lens, 207 . . . Rod Integrator, 208 to 209 . . . Relay Lens, 210 . . . TIR Prism, 301 . . . Light Blocking Mask, 302 . . . Opening

The invention claimed is:

1. A projection-type video image display apparatus emitting light to a display element which generates a video image to project the video image, the projection-type video image display apparatus comprising:
independent light sources configured to emit light rays of a plurality of colors including at least red, blue, and green, respectively;
a mirror configured to reflect white light obtained by synthesizing the light rays emitted from the light sources while making the white light pass through the mirror based on predetermined transmittance characteristics;
an illuminance sensor disposed on a back surface side of the mirror and configured to measure quantity of light of each color of the white light which has passed through the mirror; and
a controller configured to acquire information on the quantity of light measured by the illuminance sensor and adjust an amount of light emission of the light source of each color based on the acquired information,
wherein the mirror is formed so as to have such transmittance characteristics that each of light transmittances in a center wavelength of a red light source and in a center wavelength of a blue light source is larger than a light transmittance in a center wavelength of a green light source.

2. The projection-type video image display apparatus according to claim 1,
wherein the mirror is formed so as to have such transmittance characteristics that the light transmittance in the center wavelength of the green light source is less than 1% and each of the light transmittances in the center wavelength of the red light source and in the center wavelength of the blue light source is larger than 1%.

3. The projection-type video image display apparatus according to claim 1,
wherein the mirror is formed so as to have such transmittance characteristics that each of the light transmittances in the center wavelength of the red light source and in the center wavelength of the blue light source is three or more times larger than the light transmittance in the center wavelength of the green light source.

4. The projection-type video image display apparatus according to claim 1,
wherein, in the transmittance characteristics of the mirror, the light transmittance in the center wavelength of the blue light source is larger than the light transmittance in the center wavelength of the red light source.

5. The projection-type video image display apparatus according to claim 1,
wherein, in an illumination optical system optical axis in which the light ray of each color emitted from each of the light sources reaches the display element, the illumination optical system optical axis of each color is common to one another after the light rays of respective colors are synthesized to white light,
the mirror is disposed on the common illumination optical system optical axis, and
the illuminance sensor is disposed on an extended line of the common illumination optical system optical axis.

6. The projection-type video image display apparatus according to claim 5,
wherein the illuminance sensor is a planar sensor and disposed such that a surface serving as a light receiving portion is perpendicular to the extended line of the common illumination optical system optical axis.

7. The projection-type video image display apparatus according to claim 1,
wherein an area of a light receiving portion of the illuminance sensor is smaller than an area of an irradiation range of the white light which has passed through the mirror.

8. The projection-type video image display apparatus according to claim 1, wherein a light blocking member having an opening through which the white light which has passed through the mirror can pass is disposed on the back surface side of the mirror.

9. The projection-type video image display apparatus according to claim 8,
wherein an area of a light receiving portion of the illuminance sensor is smaller than an area of the opening, and
the area of the opening is smaller than an area of an irradiation range of the white light which has passed through the mirror.

* * * * *